United States Patent [19]

Kirsch

[11] Patent Number: 4,742,747
[45] Date of Patent: May 10, 1988

[54] ARRANGEMENT FOR SETUP, REPLACEMENT, AND CLAMPING OF CUTTING TOOLS IN A CUTTING MACHINE

[75] Inventor: Alois Kirsch, Günzburg, Fed. Rep. of Germany

[73] Assignee: Güunzburger Werkzeugmaschinenfabrik (GWF), Gunzburg, Fed. Rep. of Germany

[21] Appl. No.: 17,705

[22] Filed: Feb. 24, 1987

[30] Foreign Application Priority Data

Feb. 21, 1986 [DE] Fed. Rep. of Germany ....... 3605641

[51] Int. Cl.⁴ .............................................. B23D 35/00
[52] U.S. Cl. ........................................ 83/698; 83/700
[58] Field of Search ................ 83/698, 699, 700, 571; 29/560; 408/239 A, 239 R, 238; 409/234; 279/1 A

[56] References Cited

U.S. PATENT DOCUMENTS 3,559,522 2/1971 Valente ................................. 83/571
4,534,421 8/1985 Allan ................................. 83/698 X

FOREIGN PATENT DOCUMENTS 1080095 8/1967 United Kingdom ................. 83/698

Primary Examiner—E. R. Kazenske
Assistant Examiner—Hien H. Phan
Attorney, Agent, or Firm—Toren, McGeady & Associates

[57] ABSTRACT

In a sheet metal plate shears, the cutting tools can be mounted on adapters and, when needed, the adapters with the cutting tools can be inserted into sliding guides positioned in and extending across the length of the plate shears. The cutting tools are adjustably secured to the adapter by fastening members. When properly located in the plate shears, the adapters with the cutting tools can be secured in position. After the cutting tools experience excessive wear, they can be removed along with the supporting adapters and replaced.

15 Claims, 1 Drawing Sheet

ARRANGEMENT FOR SETUP, REPLACEMENT, AND CLAMPING OF CUTTING TOOLS IN A CUTTING MACHINE

BACKGROUND IN THE INVENTION

The present invention is directed to an arrangement for the setup, clamping and replacement of cutting tools, such as the top and bottom cutters in a sheet metal plate shears.

In the past, cutting tools have been fastened mainly directly to the cutting machine by means of fastening elements such as screws. If a different material had to be cut or if the cutting tool experienced excessive wear, the tools had to be unscrewed from the tool carrier. Such removal operations have proved to be disadvantageous, since the removal operation takes a considerable period of time as does the setting up and adjustment of the new cutting tool, especially if the lower cutter has to be resharpened and if it is displaceable in elongated holes and has to be reset by means of spacers so that it is adjusted exactly to the table height. When spacers are being installed, the heavy bottom cutter presses downwardly and adjustment becomes difficult. The adjustment becomes even more difficult, because lifting of heavy cutting tools by a crane is hindered by the machine stand itself. Accordingly, the replacement of a cutting tool involves a long downtime for the cutting machine which is very expensive, so that economic utilization of the machine cannot be attained due to frequent retooling.

SUMMARY OF THE INVENTION

Therefore, the primary object of the present invention is to provide a cutting machine in which the cutting tools can be quickly and securely replaced avoiding the disadvantages entioned above. Further, the cutting tools can be prepared in a simple manner prior to their required installation in the cutting machine.

In accordance with the present invention, an adapter is provided for each cutting tool and the adapter can be adjusted and clamped in the machine frame. A sliding guide is provided in the machine and extends for the length of the adapter with the sliding guide, in the form of a clamping strip, being slidably engageable within a recess in the adapter. When the cutting tool is set in position, the clamping strip or sliding guide provides a positive lock for the adapter and cutting tool.

An advantage gained by the present invention is that the cutting tools can be set up and adjusted in the adapters outside of the cutting machine so that, when placed on the machine, the tools are parallel to one another and flush with the table surfaces of the associated machine part.

In addition to simplifying the work of the machine operator, a more efficient utilization of the machine is achieved, since the time consuming adjustment processes can be carried out while the machine is operating, that is, prior to installation of the cutting tool in the machine. The replacement of the cutting tools can be carried out very quickly. After use, the adapters can be pulled out of the cutting machine when the clamping means have been released and moved onto transporting carriages located at a position so that the adapters can be moved directly onto the carriage. Alternatively, support arms can be provided at the sides of the machine and pivoted into position to receive the adapters and cutting tools. With the cutting tool pre-set on the adapter, it can be moved along with the adapter into the sliding guides and once in position be clamped by pressing a button whereby the replacement of the cutting tools can be carried out quickly by one person. In the past, such replacement has required two or three workmen, since the various steps of replacing the tools required adjustment and fastening by means of a plurality of screws or bolts while the machine is out of operation. With the present invention, the downtime previously experienced is eliminated and the replacement can be carried out in a quick and effective manner. To improve the quality of the cutting operation, in accordance with the present invention, cutting edge changes can be carried out in an advantageous manner and smaller lots of different sheet metal materials, such as high strength steel and structural steel, can be effected economically with appropriately designed and adjusted cutting tools.

The present invention is particularly advantageous if an automatic tool replacement device is provided for the cutting machine so that the used tool adapters are placed in a storage compartment along side the cutting machine with the replacement device arranged to slide adapters and replacement cutting tools into the cutting machine and then clamping the tool adapters in position in a controlled procedure.

As an example, outrigger shelves can be used as storage members for several sets of adapters with a handling device withdrawing the adapters from the side of the cutting tool such as a sheet metal plate shears and then removing a replacement adapter from the storage member and positioning it at the predetermined height by moving the adapter along a clamping strip acting as a slide guide. For this purpose, paternoster cabinets are advantageous where the bottom of the storage member or compartment can be adjusted to the height of the table or the ramp in the cutting machine whereby a simple unit acting rectilinearly, such as a hydraulic cylinder, can be used for moving the adapter into and out of position in the cutting machine.

Another advantage of the present invention is the improved safety achieved, since the operator is no longer required to work in a position inside the machine below the cutter while the replacement of the cutting tool is being carried out.

BRIEF DESCRIPTION OF THE DRAWING

The drawing is a side view, partly in section, of a cutting machine embodying the present invention.

DETAILED DESCRIPTION OF THE INVENTION

Figure 1:
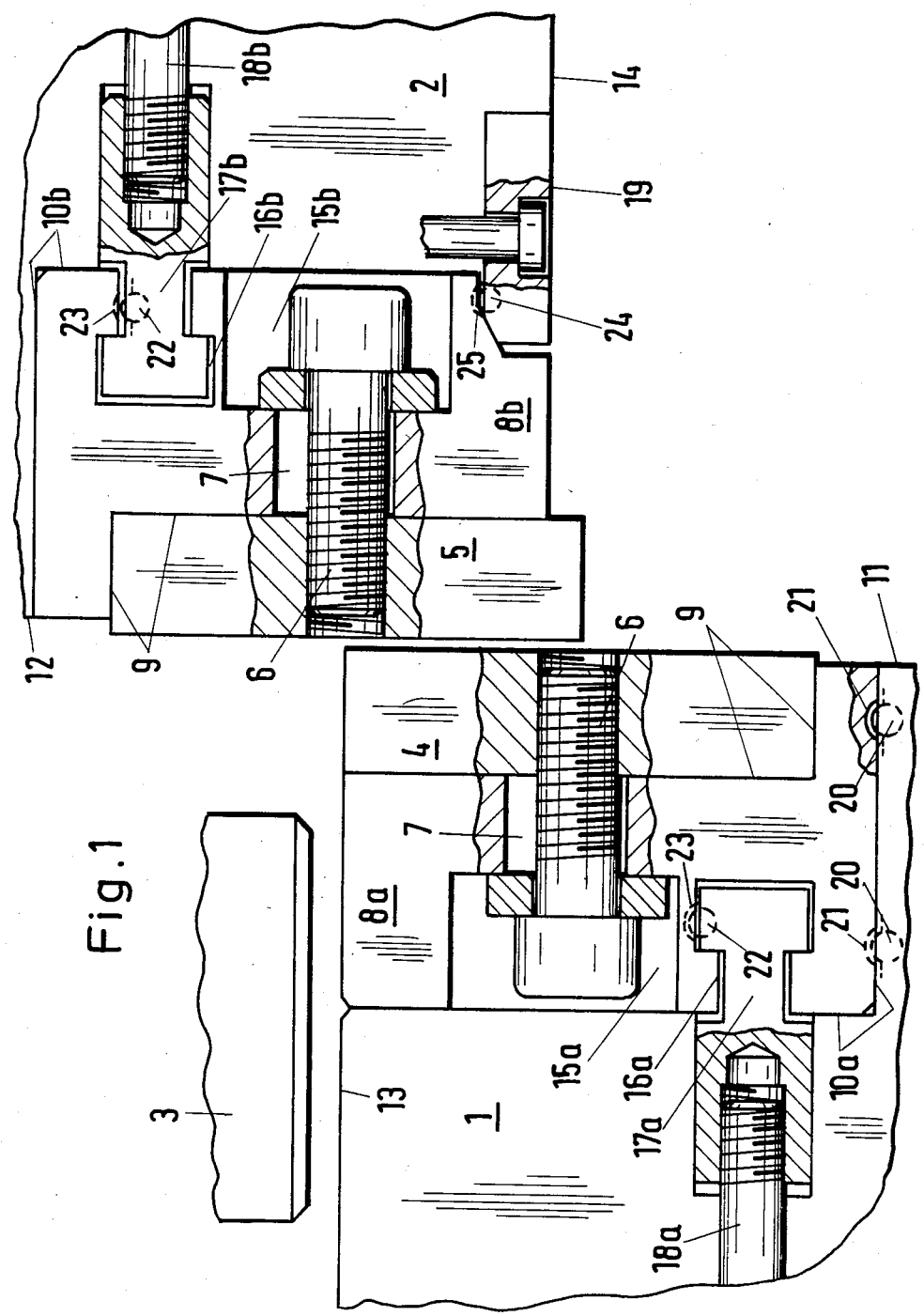

In the drawing, a cutting machine or sheet metal plate shears is shown during a cutting operation and includes a cutter table 1 on the left, an upper cutter cheek 2 on the right and a hold-down device or pressure pad 3. A lower cutter 4 is mounted on the cutter table 1 and an upper cutter 5 is positioned on the upper cutter cheek 2. The upper and lower cutters 4, 5 are shown in side view. Each of the cutters is held in place by a fastening unit 6 adjustable within slots 7 in the adapters 8a, 8b, embodying the present invention. The lower and upper cutters 4, 5 can be set up on the adapters 8, 8a, 8b, respectively, outside of the plate shears.

The lower and upper cutters 4, 5 are retained in the adapters 8a, 8b bearing against an L-shaped tool support face 9, located on each adapter. In turn, the adapters each have an L-shaped contact face 10a, 10b with the contact face 10a, bearing against the cutter table 1 and being flush with the outer face 11 of the plate shears. The contact face 10b bears against the upper cheek 2 and is flush with the outer face 12 of the upper cutter cheek 2. In addition, the upper surface of the adapter 8a, is flush with the table surface 13 of the cutter table 1, and the lower surface of the adapter 8b, is flush with the cheek surface 14 of the upper cutter cheek 2. The fastening units 6 are arranged in recesses 15a, 15b in the adapters 8a, 8b. Each adapter 8a, 8b, has a T-shaped groove or recess 16a, 16b extending across the length of the adapters. A clamping strip 17a mounted within the cutter table 1, extends through the recess 16a in the adapter 8a. Similarly, a T-shaped clamping strip 17b is supported in the upper cutter cheek 2, and engages within the recess 16b in the adapter 8b.

Due to their arrangement, the clamping strips 17a, 17b, each form a sliding guide for the corresponding adapter 8a, 8b. To effect the movement of the adapters without any difficulty onto the supporting members or cutter table 1 and upper cutter check 2, the clamping strips 17a, 17b extend across the entire length of the front or cutting face of the machine. For larger shear lengths, several adapters are used and they are slid into place over a continuous sliding guide. To facilitate the movement of the adapters into operating position, sliding means 20, such as in the form of ball slides, are provided at the contact faces of the machine support. Accordingly, the adapters move over the sliding means until they reach their intended position and then engage into indentations or recesses in the contact face 10a of the adapter 8a, with the adapter contact face 10a bearing on the support surface formed by the cutter table 1.

A continuous support strip 19 is secured within a recess in the lower surface of the upper cutter check 2 for supporting the adapter 8b on which the upper cutter 5 is mounted. Accordingly, the continuous strip 19, along with the clamping strip 17b, holds the adapter 8b against the action of gravity. If the clamping strip 17b is adequately designed it can support the adapter 8b against the effect of gravity. Sliding means 22, such as ball slides, can be mounted in the clamping strips 17a, 17b, for effecting the sliding movement of the adapters into position on the plate shears. The sliding means includes cooperating recesses or indentations 23 so that the clamping strips or sliding guides 17a, 17b are retained in the desired position. While the support strip 19 retains the adapters 8b, against any downward movement due to gravity, it is also equipped with sliding means 24, 25 on its upper surface. For automatic tool replacement, by arranging the guide faces of the support strip 19 and of the adapter 8b, as inclined run-up faces, it is possible that during the clamping operation the adapter 8b can be slightly lifted. Further, the adapter 8b can be pressed at its upper contact face 10b, against the surface of the cutting machine prior to securing the clamping strip 17b, by displacement against a stop or against the sheet metal to be cut.

Preferably, the clamping of the adapters 8a, 8b at their vertical contact faces 10a, 10b is effected by hydraulic elements) not illustrated, rigidly secured at the cutter table 1 and at the cutter cheek 2, to secure the adapters in place. The hydraulic elements are connected with the clamping strips 17a, 17b by the tie rods 18a, 18b. To insure clamping security during operation of the plate shears, movement of the upper cutter 5 is interrupted in the case of a pressure drop in the hydraulic elements or the clamping is maintained by spring elements, not illustrated, such as spring discs. The clamping action is hydraulically released for replacing the cutting tools with the machine in the inoperative condition.

I claim:
1. An arrangement for the set-up, clamping and replacement of cutting tools in a cutting machine such as an upper and lower cutter in a sheet metal plate shears, wherein the improvement comprises a machine support member (1, 2), an elongated cutting tool (4, 5), an adapter (8a, 8b) for mounting said cutting tool, said adapter having a length extending in the elongated direction of said cutting tool and replaceably mounted on said machine support member, means (6) for adjustably fastening said cutting tool on said adapter, said adapter having a recess (16a, 16b) therein extending across the length of said adapter) an elongated clamping strip (17a, 17b) mounted on said machine support member and engageable within said recess (16a, 16b) for securing said adapter in a positive manner to said machine support member, said clamping strip being displaceable between a released position for replacing said adapter and a locked position for securing said adapter to said machine support member.

2. Arrangement, as set forth in claim 1, wherein said adapter (8a, 8b) with said cutting tool (4, 5) mounted thereon is slidable in the elongated direction of the cutting tool into said machine support member (1, 2) with said adapter moving along said clamping strip, and said adapter having contact faces (10a, 10b) thereon, arranged to bear against said machine support member and said adapter being replaceable with said clamping strip in the released position.

3. Arrangement, as set forth in claim 2, wherein sliding means are provided in the contact faces (10a, 10b) of said adapter and in said machine support member (1,2) and said sliding means arranged for facilitating the sliding movement of said adapter into and out of said machine support member.

4. Apparatus, as set forth in claim 3, wherein said sliding means comprises ball slides mounted in one of said machine-support member and said adapter, and indentations arranged in the other one of said machine support member and said adapter, with said ball slides arranged to seat in said indentations.

5. Arrangement, as set forth in claim 1, wherein sliding means are provided for effecting the sliding movement of said adapter (8a, 8b) on said clamping strip (17a, 17b), said clamping strip having an upper side and a lower side.

6. Apparatus, as set forth in claim 5, wherein said sliding means comprises ball slides mounted in one of said machine-support member and said adapter, and identations arranged in the other one of said machine support member and said adapter, with said ball slides arranged to seat in said indentations.

7. Arrangement, as set forth in claim 1, wherein said machine support member (1, 2) comprises an upper cutter cheek (2), a continuous support strip secured to a lower side of said upper cutter check and said support strip located below and supporting said adapter (8b) mounted on said upper cutter cheek.

8. Arrangement, as set forth in claim 7, including sliding means associated with said adapter (8b) and said support strip (19) for facilitating the movement of said adapter into position on said upper cutter cheek.

9. Apparatus, as set forth in claim 8 wherein said sliding means comprises ball slides mounted in one of said machine-support member and said adapter, and indentations arranged in the other one of said machine support member and said adapter, with said ball slides arranged to seat in said indentations.

10. Arrangement, as set forth in claim 1, comprising means attached to said clamping strip (17a, 17b) for displacing said clamping strip between the released position and the locked position.

11. Arrangement, as set forth in claim 1, wherein a tie rod (18a, 18b) is attached to said clamping strip (17a, 17b) for moving said clamping strip between the released position and the locked position, and hydraulic means secured to said tie rods for actuating said tie rods.

12. Arrangement, as set forth in claim 11, including means for interrupting the movement of said adapter and cutting tool mounted thereon when pressure in said hydraulic means drops.

13. Arrangement, as set forth in claim 1, wherein said adapter (8a, 8b) has an L-shaped contact face for supporting said cutting tool.

14. Arrangement, as set forth in claim 1, wherein said adapter has a horizontal surface arranged to be flush with a plane of said machines support member (1,2).

15. Arrangement, as set forth in claim 1, wherein said machine support members comprises a lower cutter table (1) and an upper cutter cheek (2), said cutting tools comprising a lower knife and an upper knife mounted on said adapter, and said adapters being substantially identical and interchangeable.

* * * * *